(12) United States Patent
Van Den Berg

(10) Patent No.: US 11,473,965 B2
(45) Date of Patent: Oct. 18, 2022

(54) DEVICE FOR MOVING A LOAD AND A LIFTING MEMBER THEREFOR

(71) Applicant: RAVAS EUROPE B.V., Zaltbommel (NL)

(72) Inventor: Niels Van Den Berg, Den Bosch (NL)

(73) Assignee: RAVAS EUROPE B.V., Zaltbommel (NL)

( * ) Notice: Subject to any disclaimer, the term of this patent is extended or adjusted under 35 U.S.C. 154(b) by 382 days.

(21) Appl. No.: 16/617,674

(22) PCT Filed: Jun. 7, 2018

(86) PCT No.: PCT/NL2018/050372
§ 371 (c)(1),
(2) Date: Nov. 27, 2019

(87) PCT Pub. No.: WO2018/226099
PCT Pub. Date: Dec. 13, 2018

(65) Prior Publication Data
US 2020/0141790 A1 May 7, 2020

(30) Foreign Application Priority Data

Jun. 8, 2017 (NL) .................................... 2019033
Aug. 14, 2017 (NL) .................................... 2019412

(51) Int. Cl.
*G01G 19/08* (2006.01)
*B66F 9/12* (2006.01)

(52) U.S. Cl.
CPC .............. *G01G 19/083* (2013.01); *B66F 9/12* (2013.01)

(58) Field of Classification Search
CPC ................................ G01G 19/083; B66F 9/15
See application file for complete search history.

(56) References Cited

U.S. PATENT DOCUMENTS 9,878,888 B2 * 1/2018 Giannetti .............. G01G 19/083
2003/0010542 A1 * 1/2003 Simons ................. G01G 19/083
177/136

(Continued)

FOREIGN PATENT DOCUMENTS

CN 201121121 Y * 9/2008
CN 112811357 A * 5/2021 .......... B66F 9/07504

(Continued)

OTHER PUBLICATIONS

ISA/EPO, International Search Report and Written Opinion, dated Oct. 10, 2018 re PCT International Patent Application No. PCTNL2018050372.

*Primary Examiner* — Natalie Huls
(74) *Attorney, Agent, or Firm* — Perry + Currier Inc.

(57) ABSTRACT

A device for moving a load comprises a mobile, in particular rolling chassis (10) from which a lifting device (20) extends with at least one lifting member (30). The lifting device is intended and configured to receive the load (5) thereon. The lifting member comprises a substantially L-shaped base (31) with a lying leg (311) and an upright leg (312) mutually connected by a bend (313). The lifting member further comprises a shoe (33) which extends over the base (31) with interposing of at least one weight sensor (32) of electronic weighing means. The shoe (33) is likewise substantially L-shaped with a lying leg (331) and an upright leg (332), wherein the upright leg (332) of the shoe (33) maintains an intermediate space in relation to the upright leg (312) of the base (31). A base unit (40) of the weighing means is received at least substantially wholly in the intermediate space between the two legs (31,33).

14 Claims, 3 Drawing Sheets

(56) References Cited

U.S. PATENT DOCUMENTS

| | | | |
|---|---|---|---|
| 2003/0234122 A1* | 12/2003 | Kroll | G01G 19/083 |
| | | | 177/146 |
| 2006/0260877 A1 | 11/2006 | Ito et al. | |
| 2008/0178690 A1* | 7/2008 | Simons | G01G 19/083 |
| | | | 73/862.541 |
| 2015/0225218 A1 | 8/2015 | Strand | |
| 2016/0047688 A1* | 2/2016 | Richards | B66F 9/12 |
| | | | 177/139 |
| 2017/0261364 A1* | 9/2017 | Liang | G01G 19/083 |

FOREIGN PATENT DOCUMENTS

| | | |
|---|---|---|
| DE | 9214818 U1 | 1/1993 |
| DE | 102010050930 B4 | 10/2014 |
| FR | 2790463 A1 | 9/2000 |
| NL | 1033278 C2 | 7/2008 |
| NL | 1037015 C2 | 12/2010 |
| WO | WO-2010140880 A2 | 12/2010 |
| WO | WO-201014088 A3 | 6/2012 |
| WO | WO-2014181199 A1 | 11/2014 |

* cited by examiner

DEVICE FOR MOVING A LOAD AND A LIFTING MEMBER THEREFOR

The present invention relates to a device for moving a load, comprising a mobile, in particular rolling chassis from which a lifting device extends with at least one lifting member, which lifting device is intended and configured to receive the load thereon, wherein the lifting member comprises an at least partially lying base and a shoe which extends over a lying part of the base with interposing of at least one weight sensor of electronic weighing means for recording and generating as electronic signal a magnitude of a load carried by the shoe, which weighing means comprise a base unit with at least electronic processing means and an electronic power supply, which base unit is coupled via an electronic connection to the at least one weight sensor.

Such a device is applied on large scale as forklift truck or pallet truck for moving cargoes, for instance in distribution centres and at other locations where cargoes have to be moved, usually referred to as material handling. During such manipulations with a load it is increasingly desirable during the movement to obtain an indication of a weight, and preferably also of a position of the cargo to be moved. Such an indication can serve different purposes here. If overturning protection means are provided in the device, they can generate a warning to an operator when a limit value deemed to be safe is exceeded. This is determined here on the basis of a number of loads recorded at separate positions. In addition or instead a recorded weight and/or a calculated position of the cargo can optionally also be displayed visually to the operator via a display unit to be provided for the purpose so that this information can be used and processed in the further logistical operation.

A device of the type described in the preamble has been successfully carried and marketed for a considerable time by applicant. In this known device the base comprises a lying leg and an upright leg mutually connected by a bend. In the upright leg a recess is provided beyond the bend in the base so as to form a cavity so that the base unit can be accommodated therein. With a view to retaining structural strength this cavity is recessed in the upright leg well beyond the bend. The cavity is covered with a plate body which is screwed to the upright leg in order to protect the base unit and the battery with which the base unit is powered. A groove or a set of grooves extends from the cavity into the lying leg of the base in order to accommodate cabling between the weight sensor(s) and the base unit of the weighing means.

Although the known device functions satisfactorily per se and provides an adequate weight indication, retrofitting of a device with such weighing means is nevertheless found to be laborious and therefore time-consuming. Furthermore, a plurality of different available types of lifting member of lifting devices of individual manufacturers and suppliers in the market in combination with different desired battery positions results in a relatively wide variation in required cable lengths and cable cores between the base unit and the weight sensor(s). This results in turn in relatively high stock levels.

The present invention therefore has for its object, among others, to provide a device for moving a load which can be equipped in a more practical manner with the weighing means.

In order to achieve the stated object a device of the type described in the preamble has the feature according to the invention that the shoe comprises on a proximal side a solid upright part which leaves an intermediate space in relation to a further part of the device, and that at least the base unit of the weighing means is received at least substantially wholly in the intermediate space behind the upright part. A recess thus no longer need be made in the base and the base unit can be placed lower, wherein the solid upright part provided on the shoe provides for the desired mechanical protection. The base unit in particular can thus be placed at a more uniform height, whereby the cabling to the at least one weight sensor can also be more uniform.

A particular embodiment of the device has the feature according to the invention that the base is substantially L-shaped with a lying leg and an upright leg mutually connected by a bend, and that the upright part of the shoe and the upright leg of the base mutually enclose a chamber in which the base unit of the weighing means is at least substantially wholly accommodated. Between the base and the shoe a chamber is thus formed which provides space for the base unit of the weighing means. This chamber is bounded on a frontal side by the upright part of the shoe which thereby provides the base unit with physical protection from a possible impact. A particular embodiment of the device according to the invention is characterized in this respect in that the base and shoe of the lifting member are formed substantially wholly from metal, in particular steel.

A preferred embodiment of the device according to the invention is characterized in that the shoe is likewise substantially L-shaped with a lying leg and an upright leg, wherein the upright leg of the shoe comprises the upright part and, with the upright leg of the base, encloses the intermediate space, and that the base unit of the weighing means is received at least substantially wholly in the intermediate space between the two upright legs. A recess in the base as well as the provision of a separate protective cover are thus no longer necessary. This results in practice in a significant operational time-saving when equipping a device for moving a load with weighing means in both initial manufacture and retrofitting.

A particular embodiment of the device according to the invention has the feature that the electronic connection between the base unit and the weight sensor comprises a wired cable connection. Because a recess need no longer be made in the base, no structural loss of strength occurs in the lifting member and the base unit can be arranged at a fixed distance from the bend. A required cable length is thus determined solely by a distance to the weight sensor(s), whereby fewer variations thereof have to be kept in stock.

A preferred embodiment of the device according to the invention has the feature here that the base unit is accommodated in a housing and that the housing comprises a chamber for receiving an excess length of the cable connection therein. A possible excess of cable which can thus be accommodated in this chamber in the housing allows a further reduction in the number of embodiments which have to be kept in stock, or at least have to be provided, in order to anticipate variations in dimensions of lifting members occurring in commercially available lifting devices.

With a view to an integral protection of both the base unit and the weight sensor(s) concealed under the shoe, a further preferred embodiment of the device according to the invention has the feature that the shoe comprises on either side a set of downward directed side pieces which laterally flank the lying part of the base. The side pieces thus cover a gap provided for the purpose of a clearance required between the shoe and the weight sensors. Not only does this provide a physical protection, the lifting member thus also has the appearance of a single attractive whole.

In order to keep the base unit accessible for service and/or operation without compromising effective protection of the base unit placed concealed behind the shoe, a further preferred embodiment of the device according to the invention has the feature that at least one of the side pieces is provided at the position of the base unit with a window through which the base unit is accessible. A further particular embodiment of the device according to the invention has in this respect the feature that the base unit comprises at the position of the window a power supply unit which is accessible, and preferably removable and/or exchangeable, via the window, in particular a rechargeable battery or accumulator unit which—once it is positioned in the base unit—is very well protected from moisture and dirt. The power supply unit thus accessible via the window can be provided at the position of the window with an electrical connection by means of which a charging current can be supplied thereto. The device is however preferably embodied with a removable and exchangeable or replaceable power supply unit which can be recharged separately of the device or can be directly replaced by another already charged power supply unit.

With a view to direct operation or reading of the base unit a further preferred embodiment of the device according to the invention has the feature that the intermediate space is open at the top and that the base unit comprises operating means on a thus provided visible side, particularly in the form of a user interface panel recessed into the intermediate space. It has been found that, although the intermediate space is open on the visible side, sufficient protection is nevertheless provided to the base unit placed therein. Extra protection is provided here by a recessed positioning of the base unit with the control panel.

The weighing means can form part of an overturning protection, in which case an auditively and/or visually discernible alarm signal suffices to alert the user to imminent danger of overturning as a result of a cargo being placed incorrectly on the lifting device or an overload. As the case arises, weighing means can also be utilized to obtain an indication of a weight of the cargo. With this in mind a further particular embodiment of the device according to the invention has the feature that the weighing means comprise image display means for visual display of a calculated weight and/or a calculated position of the load in the lifting device, which image display means are coupled via an electronic connection to the electronic processing means.

The image display means can be provided here on or at the same housing as that of the base unit, although in a further preferred embodiment the device according to the invention has the feature that the further electronic connection comprises a wireless connection, wherein the base unit comprises transmitter/receiver means for establishing and maintaining the wireless connection to the image display means. Such a wireless connection allows a greater degree of freedom to accommodate the image display means elsewhere in or on the device at a location that is better readable by the user.

Although the invention is widely applicable, the invention relates particularly to a pallet truck, stacker or forklift truck of which the above described lifting device according to invention forms part. The invention also relates to a lifting member as applied in the above described device according to the invention, comprising a base and a shoe between which one or more weight sensors are provided. The one or more force sensors in the lifting member can thus be pre-mounted under the shoe, whereby the lifting member can be mounted and/or exchanged easily and quickly as sub-assembly.

The invention will be further elucidated hereinbelow on the basis of a number of exemplary embodiments and an accompanying drawing. In the drawing.

It is otherwise noted here that the figures are purely schematic and not always drawn to (the same) scale. Some dimensions in particular may be exaggerated to greater or lesser extent for the sake of clarity. Corresponding parts are designated in the figures with the same reference numeral.

Figure 1:
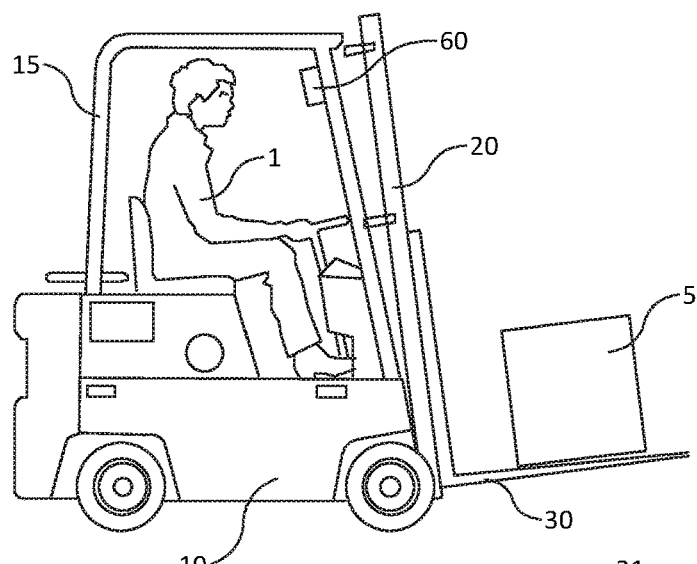
FIG. 1 shows a first exemplary embodiment of a device for moving a load according to the invention in the form of a forklift truck.
Figure 2:
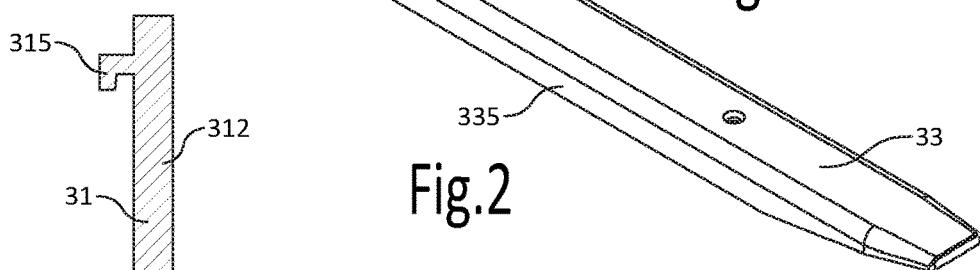
FIG. 2 is a perspective view of a lift fork according to the invention as applied in the device of FIG. 1.
Figure 3:
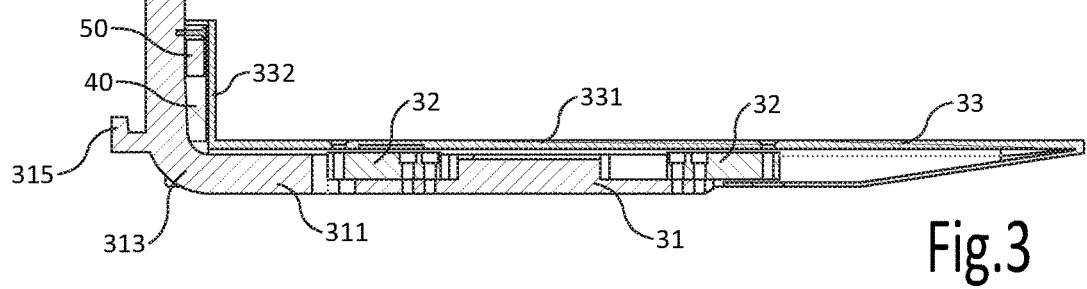
FIG. 3 shows a longitudinal section of the lift fork of FIG. 2.

Shown schematically in FIG. 1 is an example of a forklift truck according to the invention. The forklift truck comprises a mobile, i.e. self-propelled, chassis with cab 15 for a driver 1. On a front side the forklift truck comprises a lifting device 20 in the form of a mast with a fork board (not shown) on which a set of lifting members in the form of lift forks 30 is mounted for receiving a cargo or load 5 thereon, one of which is shown in further detail in FIGS. 2 and 3.

Lift forks 30 each comprise a relatively heavy solid steel fork base 31 from which extends a mast hook construction 315 with which forks 30 can be hooked to the fork board of mast 20 of the forklift truck. The fork bases are L-shaped with a lying leg 311 and an upright leg 312 which are mutually connected by a bend 313 and which take a substantially integral form. Lying over fork base 31 is a fork shoe 33 of plate steel coupled at only two support points to fork base 31. The fork shoe 33 otherwise retains a certain clearance, and thereby freedom of movement, relative to fork base 31. At each support point the fork shoe 33 is connected via a weight sensor 32, a so-called load cell, to fork base 31. These weight sensors 32 are able and configured to record a load exerted by cargo 5 on shoe 33 and generate this as an electronic signal.

The signals from all weight sensors 32 are together transmitted over a cable connection (not shown) to a base unit 40 with an electronic processing means in the form of a printed circuit board occupied by at least a microprocessor. On the basis of an algorithm loaded therein the microprocessor is able to calculate from the combination t of the separate signals from weight sensors 32 a weight of cargo 5 and generate this value as electronic signal. Also calculated from the separate signals from weight sensors 32 on the basis of an algorithm provided for the purpose is an actual position of the cargo on the lift forks, in both the width and depth. This latter information is used in combination with a recorded weight and together with an actual lifting height to anticipate imminent danger of overturning and to alert and protect the driver in a manner appropriate for the purpose.

The microprocessor is coupled to an electronic memory in which all information and incidents are if desired stored automatically and recorded as log book.

The processing means are received in a moisture and dust-tight housing 40 and are powered from an electric power supply provided for the purpose in the form of a battery pack 50. The fork shoe 33 comprises according to the invention a solid upright part 330 behind which housing 40 of the base unit is placed so that base unit 40 will be protected thereby from possible mechanical action. In this example the fork shoe 33, similarly to the fork base, takes a substantially L-shaped form with a lying leg 331 and an upright leg 332.

Upright leg 332 of fork shoe 33 thus forms a solid upright part 330 and maintains a certain intermediate space relative to upright leg 312 of the fork base so that a chamber is formed therebetween which accommodates housing 40 of the base unit. This intermediate space is open at the top but is otherwise protected all around and particularly at the front by upright leg 332 of fork shoe 33. Housing 40 is secured in this intermediate space either to the back side of shoe 332 or to upright leg 312 of the base in appropriate manner, for instance by means of screws and/or double-sided adhesive tape. Present in housing 40 is a cavity (not shown) in which possible excess cable length can if desired be stowed away.

Figure 2A:
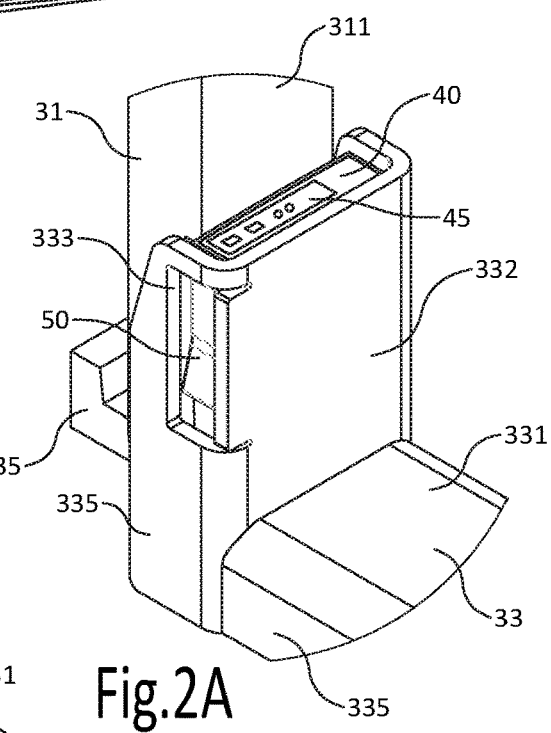
FIG. 2A is an enlarged view of a part of the lift fork of FIG. 2.

As shown more clearly in FIG. 2A, housing 40 is recessed to some extent behind the upright leg, whereby a visible side of the housing is accessible while the housing is otherwise protected particularly effectively by the steel fork shoe 33 on the one hand and the steel fork base 31 on the other. Operating means can be provided on the visible side, for instance in the form of the shown user interface panel 45 with operating buttons and one or more indicator LEDs for indicating for instance an actual condition of the battery pack.

Fork shoe 33 comprises on either side a set of downward directed side pieces 335 which flank and cover the corresponding sides of fork base 31. Fork shoe 33 hereby also covers the gap between shoe 33 and base 31 so that weight sensors 32 are also better protected. Provided however in one of the side pieces 335 at the position of battery pack 50 is a window 333 through which battery pack 50 remains accessible. Although the battery pack can be embodied per se with a sufficient battery duration to cover an operating time span of a minimum of a full day or a number of days/weeks, battery pack 50 can thus easily be removed in order to be recharged externally and/or exchanged for a fresh battery pack which provides for continued operating time.

Housing 40 further accommodates transmitter/receiver means in the form of a Bluetooth® module which is able and configured to establish and maintain a wireless connection to an image display unit 60 placed in the cab. The transmitter/receiver means are coupled to the central processing unit and receive the calculated weight as electronic signal therefrom and subsequently transmit this over the wireless connection to image display unit 60. A status LED provided for the purpose on the visible side of housing 40 displays a status and quality of this wireless connection.

Image display unit 60 comprises an (LCD) screen on which the weight is shown as alphanumeric value visible to the driver 1. Further data can also be displayed thereon graphically or non-graphically, such as for instance an overturning warning and a position of the cargo, optionally supported by an auditively discernible warning alarm. The image display unit can be powered by a replaceable battery or accumulator, but can optionally also be connected to the electrical network of the vehicle.

Figure 4:
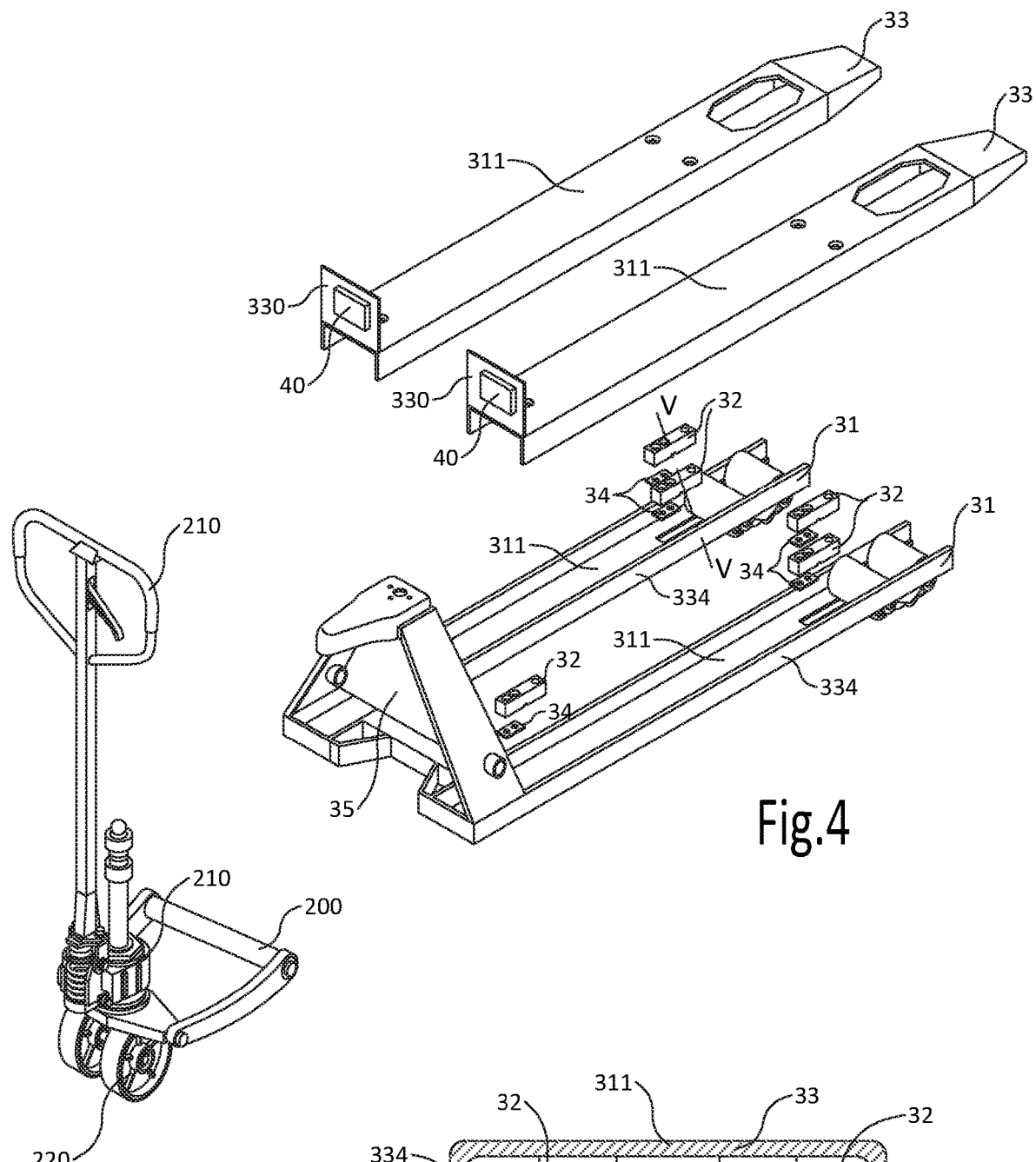
FIG. 4 shows a second exemplary embodiment of a device for moving a load according to the invention in the form of a pallet truck.

A second embodiment of a device according to the invention is shown in FIG. 4. This relates to a hand-driven pallet truck such as can be applied on large scale in distribution centres, warehouses and other locations where a load regularly has to be moved manually from one location to another. The pallet truck comprises a pump part 200 on which a lifting device 31..35 is mounted. Provided on pump part 200 is a handle 210 with which the pallet truck can be pulled or pushed manually or with which an electric motor optionally provided in the pump part can be operated as drive and assistance to the wheel 220 provided thereon. A hydraulic pump 230 which is provided in the pump part and with which lifting device 30..35 can be raised or lowered can moreover be operated with handle 210.

Figure 5:
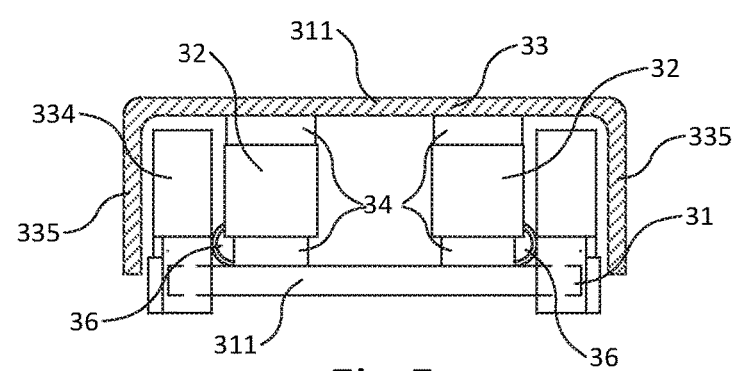
FIG. 5 shows a possible cross-section along the line V-V of FIG. 4 through the lifting member as applied in the pallet truck of FIG. 4.

As in the first example, the lifting device comprises two lift forks 30. Other than in the first example, the lift forks here comprise a common base 31 in the form of a set of lying legs 311 mutually connected by an A-frame 35. A-frame 35 is coupled to pump part 200 and is formed, just as the other parts of the lifting device, from steel parts welded to each other to form a robust whole. A respective fork shoe 33 drops over each lying leg 311 with interposing of one or more weight sensors, see also FIG. 5. Downward directed side pieces 335 formed on the shoes drop here over flanks 334 extending from legs 311 of the base so that an intermediate space between shoes 33 and base 31 is thereby protected. In order to ensure sufficient clearance between flanks 334 and shoes 33 one or more plate-like spacers 34 can be provided on the upper and/or lower side of weight sensors 32 so that the weight sensors can do their work unobstructed.

The signals generated by weight sensors 32 are relayed via a cable connection to a base unit 40 of weighing means provided for the purpose. A cable bushing 36 is provided for this purpose in base 31. According to the invention shoes 33 each comprise a solid upright part 330 behind which this base unit is placed. In this example upright part 330 is formed by a robust plate body of steel welded to the respective shoe. These plate bodies 330 maintain an intermediate space in relation to A-frame 35 so that base unit 40 lies therein protected from external mechanical influences. Each of the shoes 33 is in this case provided with an individual base unit 40; use can instead be made of a shared base unit which in that case is advantageously mounted on A-frame 35. The lifting device shown in exploded view in FIG. 4 and in cross-section in FIG. 5 can optionally be provided as sub-assembly for replacement purposes or as original part on a pump part 200.

Figure 6:
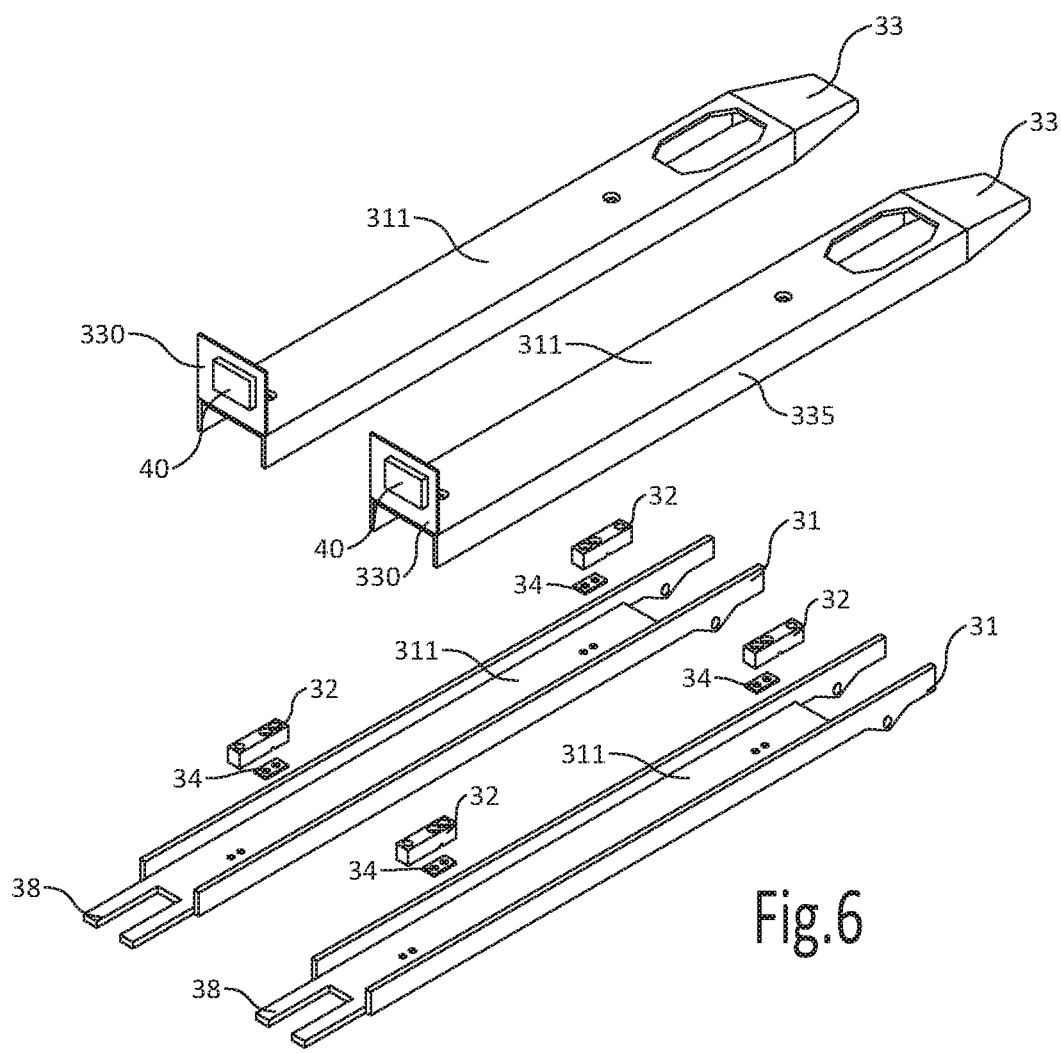
FIG. 6 shows a third exemplary embodiment of a lifting device according to the invention for the purpose of for instance a driven or non-driven pallet truck or a stacker.

The invention can likewise be embodied in the form of separate lift forks. FIG. 6 shows an example thereof. Use is made in this lifting device of fork bases 31 which are similar to the lying legs of the base of the device of FIG. 4, while individual mounting forks 38 are formed thereon instead of an A-frame for attachment in a lifting device. The construction of the lift forks, including fork shoes 33, is otherwise similar to that of FIG. 4, to which brief reference is therefore made. This embodiment of the lifting device can also optionally be provided as sub-assembly for replacement purposes or as original part on an (electric) pallet truck or warehouse truck.

Figure 7:
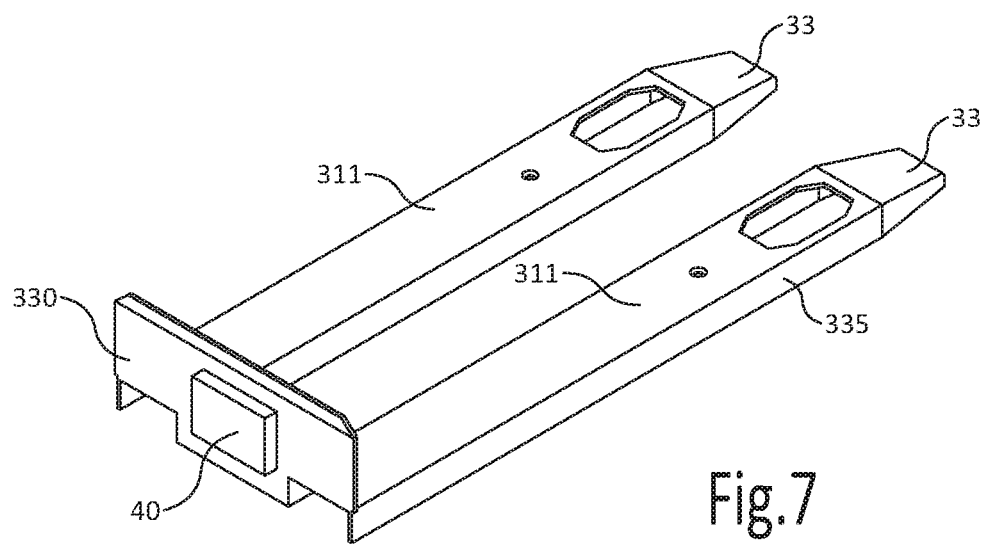
FIG. 7 shows a fourth exemplary embodiment of a lifting device according to the invention for the purpose of for instance a driven or non-driven pallet truck or a stacker.

Instead of applying separate fork shoes 33, the assembly shown in FIG. 7 can also be applied. The shoes are mutually connected herein by a common upright part 330 which provides space on a back side for base unit 40 of the weighing means. The shoes are otherwise the same or similar to those of FIG. 6. Fork base 31 can be applied in combination herewith as shown and described for instance in the embodiments of FIGS. 4 and 6. The common upright part 330 here also comprises a solid steel plate part which is welded and which provides protection to the base unit present behind it. This embodiment of the lifting device can optionally also be provided as sub-assembly for replacement purposes or as original part on an (electric) pallet truck or warehouse truck.

Although the invention has been further elucidated above with reference to only several exemplary embodiments, it will be apparent that the invention is by no means limited thereto. On the contrary, many variations and embodiments are still possible within the scope of the invention for a person with ordinary skill in the art.

In addition to being applied in a forklift truck with a set of lift forks, the invention can thus also be advantageously applied in a forklift truck with only a single lift fork or in an optionally self-propelling pallet truck and warehouse trucks. Instead of opting for a wireless connection, it is also possible to opt for a wired connection between the base unit and the display means. If desired, an optionally standard protocol for wireless signal transfer other than the described Bluetooth® protocol can moreover be applied, such as for instance also WiFi (wireless computer network) and NFC (Near Field Communication). Instead of being provided between the two upright legs of the fork and base the intermediate space for the base unit can also be provided between the lying legs of the base and the shoe respectively. Additional space can if desired be created here by being recessed into the base or the shoe.

The invention claimed is:

1. Device for moving a load, comprising a mobile chassis from which a lifting device extends with at least one lifting member, which lifting device is intended and configured to receive the load thereon, wherein the lifting member comprises an at least partially lying base and a shoe which extends over a lying part of the base with interposing of at least one weight sensor of electronic weighing means for recording and generating as electronic signal a magnitude of a load carried by the shoe, which weighing means comprise a base unit with at least electronic processing means and an electronic power supply, which base unit is coupled via an electronic connection to the at least one weight sensor, characterized in that the shoe comprises on a proximal side a solid upright part which leaves an intermediate space in relation to a further part of the device, in that at least the base unit of the weighing means is received in the intermediate space behind the upright part, in that the shoe comprises on either side a set of downward directed side pieces which laterally flank the base, and in that at least one of the side pieces is provided at the position of the base unit with a window through which the base unit is accessible.

2. Device as claimed in claim 1, characterized in that the base is substantially L-shaped with a lying leg and an upright leg mutually connected by a bend, and that the upright part of the shoe and the upright leg of the base mutually enclose a chamber in which the base unit of the weighing means is accommodated.

3. Device as claimed in claim 2, characterized in that the shoe is likewise substantially L-shaped with a lying leg and an upright leg, wherein the upright leg of the shoe comprises the upright part and, with the upright leg of the base, encloses the intermediate space, and that the base unit of the weighing means is received in the intermediate space between the two upright legs.

4. Device as claimed in claim 1, wherein the electronic connection between the base unit and the weight sensor comprises a wired cable connection.

5. Device as claimed in claim 4, characterized in that the base unit is accommodated in a housing and that the housing comprises a chamber for receiving an excess length of the cable connection therein.

6. Device as claimed in claim 1, characterized in that the base and shoe of the lifting member are formed at least substantially from metal, in particular steel.

7. Device as claimed in claim 1, characterized in that the base unit comprises at the position of the window a power supply unit which is accessible, and preferably removable and/or exchangeable, via the window, and is a rechargeable battery or accumulator unit.

8. Device as claimed in claim 1, characterized in that the intermediate space is open at the top and that the base unit comprises operating means on a thus provided visible side, particularly in the form of a user interface panel recessed into the intermediate space.

9. Device as claimed in claim 1, characterized in that the weighing means comprise image display means for visual display of a calculated weight and/or a calculated position of the load in the lifting device, which image display means are coupled via a further electronic connection to the electronic processing means.

10. Device as claimed in claim 9, characterized in that the further electronic connection comprises a wireless connection, wherein the base unit comprises transmitter/receiver means for establishing and maintaining the wireless connection to the image display means.

11. Device as claimed in claim 1, characterized in that the lifting device forms part of a forklift truck, stacker or pallet truck.

12. Device as claimed in claim 1, characterized in that said mobile chassis is a rolling chassis.

13. Lifting member as applied in the device as claimed in claim 1, comprising a base and a shoe between which one or more weight sensors are provided.

14. Lifting member as claimed in claim 13, characterized in that the shoe and the one or more weight sensors are provided together as a pre-mounted sub-assembly.

* * * * *